United States Patent [19]
Kern

[11] Patent Number: 5,634,954
[45] Date of Patent: Jun. 3, 1997

[54] FIBROUS FILTER MEDIA

[75] Inventor: Charles F. Kern, Marrietta, Ohio

[73] Assignee: Schuller International, Inc., Denver, Colo.

[21] Appl. No.: 420,528

[22] Filed: Apr. 12, 1995

Related U.S. Application Data

[62] Division of Ser. No. 221,298, Mar. 30, 1994.

[51] Int. Cl.$^6$ .................................................. B01D 46/00
[52] U.S. Cl. .................... 55/487; 55/514; 55/527
[58] Field of Search .................. 55/486, 487, 514, 55/527

[56] References Cited

U.S. PATENT DOCUMENTS

| | | | |
|---|---|---|---|
| 2,138,874 | 12/1938 | Myers | 55/527 |
| 2,251,964 | 8/1941 | Stackhouse | 55/527 |
| 3,026,609 | 3/1962 | Bryan | 55/527 |
| 3,208,205 | 9/1965 | Harms et al. | 55/487 |
| 3,877,909 | 4/1975 | Hansen | 55/514 |
| 4,334,901 | 6/1982 | Ayes et al. | 55/527 |
| 4,728,349 | 3/1988 | Oshitari | 55/487 |
| 4,759,782 | 7/1988 | Miller et al. | 55/487 |
| 4,878,929 | 11/1989 | Tofsland et al. | 55/527 |
| 5,389,121 | 2/1995 | Pfeffer | 55/527 |

*Primary Examiner*—C. Scott Bushey
*Attorney, Agent, or Firm*—Cornelius P. Quinn

[57] ABSTRACT

Air filtration media is formed by collecting a layer of fine diameter glass fibers directly on a foraminous, reinforcing, backing layer and subsequently collecting a layer of relatively coarse diameter glass fibers directly on the layer of fine diameter glass fibers. A bonding agent carried by the glass fibers is then cured to bond the glass fibers within each layer together at their points of intersection, to bond the layers of fine and coarse glass fibers together and to bond the layer of fine diameter fibers to the backing layer. This method of forming the composite air filtration media permits the particle efficiency and the dirt loading capacity of the composite air filtration media to be adjusted during the production of the media by adjusting the diameters of the glass fibers in one or both of the layers and/or by adjusting the density of one or both of the layers.

3 Claims, 2 Drawing Sheets

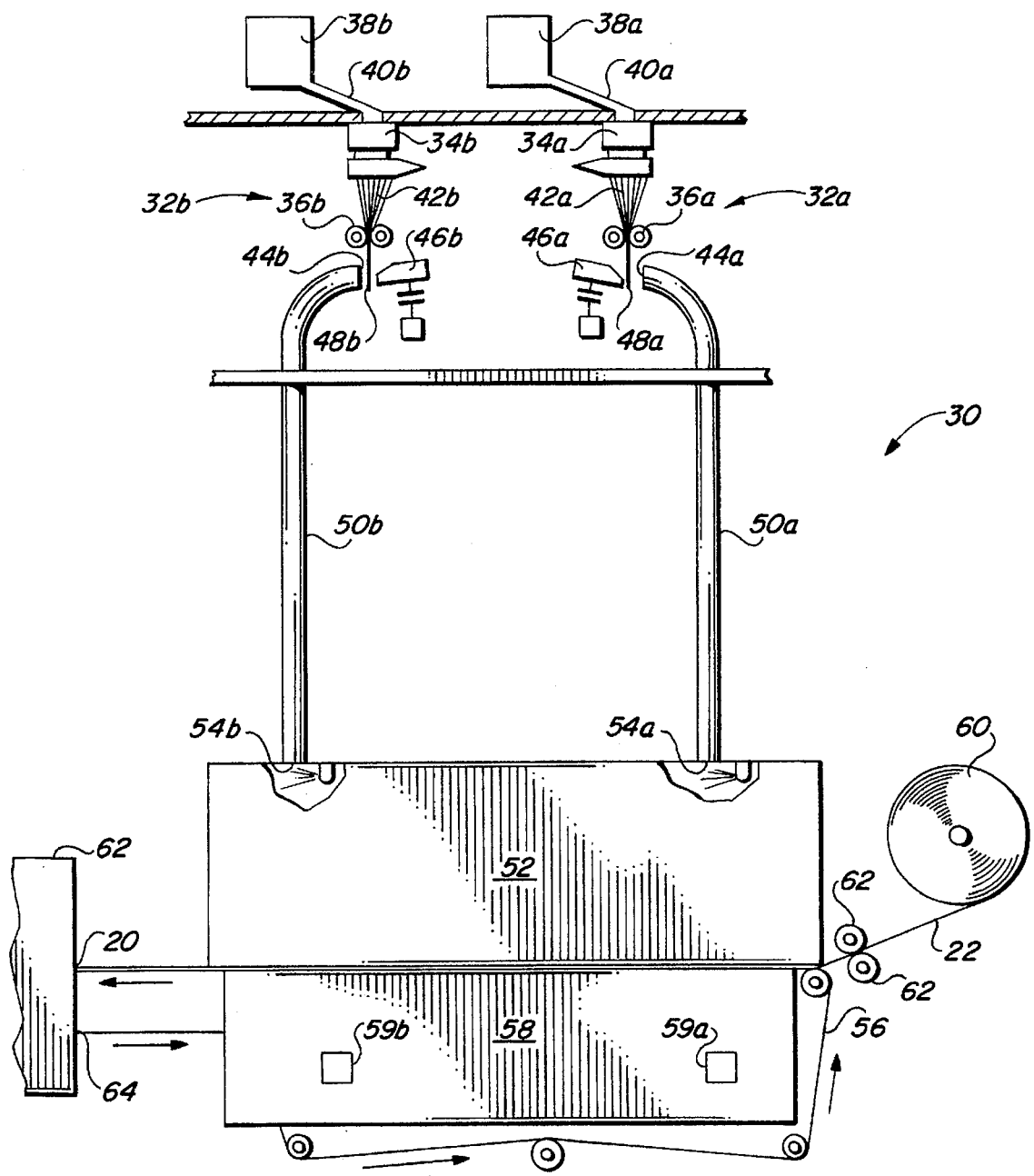

FIBROUS FILTER MEDIA

This application is a division of application Ser. No. 08/221,298, filed Mar. 30, 1994.

BACKGROUND OF THE INVENTION

The present invention is directed to a method of manufacturing a continuous glass fiber mat of air filtration media and, in particular, to a method of manufacturing a continuous glass fiber mat or blanket of air filtration media which is a composite of glass fiber layers of differing average fiber diameters and weights and the air filtration media produced in accordance with the method.

Single layer, glass fiber air filtration media is commonly used in the filtration of dirt from air streams in heating, ventilating and air conditioning systems and other air handling systems. The single layer glass fiber air filtration media is manufactured as a continuous mat or blanket comprising glass fibers of an average fiber diameter which is either coarse or fine.

It is an object of the present invention to provide a unique method of manufacturing a continuous, glass fiber air filtration media which has the dirt loading capacity of single layer coarse glass fiber air filtration media and the fine particle efficiency of single layer fine glass fiber air filtration media. In fact, the air filtration media, produced in accordance with the method of the present invention, has a much greater dirt loading capacity than single layer air filtration media of comparable particle efficiency.

It is a further object of the present invention to provide a composite, glass fiber air filtration media that achieves the same dirt loading and particle efficiency as a single layer glass fiber air filtration media, at a lower pressure drop across the air filtration media. Since less horsepower is required to move air through the air filtration media of the present invention, the lower pressure drop across the air filtration media allows air filtration systems utilizing the air filtration media of the present invention to be operated more economically.

SUMMARY OF THE INVENTION

In the method of the present invention, a continuous sheet of a foraminous, reinforcing, backing layer is passed through a collection chamber on a foraminous collection conveyor. A continuous layer of fine diameter glass fibers carrying a bonding agent is collected directly on the backing layer to a predetermined weights per unit area. A continuous layer of coarse glass fibers carrying a bonding agent is then collected directly on the layer of fine glass fibers to a predetermined weight per unit area. The adjacent glass fibers at the interface of the fine glass fiber layer and the coarse glass fiber layer become thoroughly entangled as the coarse glass fiber layer is collected on the fine glass fiber layer forming a composite air filtration media mat or blanket. The bonding agent carried on the fine and coarse glass fibers is then cured: bonding the glass fibers within each layer together at their points of intersection; bonding the entangled glass fibers at the interface of the fine and coarse glass fiber layers together at their points of intersection; and bonding the glass fibers of the fine glass fiber layer to the backing layer at the interface of the fine glass fiber layer and the backing layer.

With the method of the present invention, the filtration characteristics of the glass fiber air filtration media being produced on a production line can be changed without shutting down the process. This enables a transition from a first air filtration media product to a second air filtration media product having different air filtration characteristics as required or desired to fill orders, inventory, etc and gives the filtration media manufacturer the flexibility to economically produce air filtration products with different filtration characteristics.

With the method of the present invention, the average fiber diameter of the fine diameter fibers in the fine glass fiber layer and the weight per unit area of the fine glass fiber layer determine the particle efficiency of the composite filtration media. Accordingly, the particle efficiency of the composite air filtration media of the present invention can be adjusted to a desired efficiency by changing the average fiber diameter of the fine diameter fibers in the fine glass fiber layer and/or by changing the weight per unit area of the fine glass fiber layer.

With the method of the present invention, the average fiber diameter of the coarse diameter fibers in the coarse diameter fiber layer and the weight per unit area of the coarse diameter fiber layer determine the dirt loading capacity of the composite filtration media. Accordingly, the dirt loading capacity of the composite air filtration media of the present invention can be adjusted to a desired capacity by changing the average fiber diameter of the coarse diameter fibers in the coarse glass fiber layer and/or by changing the weight per unit area of the coarse glass fiber layer.

Thus, by selectively changing the average fiber diameters of the fine and/or coarse diameter fibers and the weights of the fine and/or coarse glass fiber layers, numerous composite air filtration media products, having different filtration characteristics can be produced on a production line without any substantial interruption in the process. These composite air filtration media products have a much greater dirt loading capacity than single layer air filtration media of comparable particle efficiency and exhibit a lower pressure drop across the filtration media than single layer air filtration media having the same dirt loading and particle efficiency as the composite air filtration media of the present invention.

BRIEF DESCRIPTION OF THE DRAWINGS

FIG. 1 is a section through a composite air filtration media of the present invention.

FIG. 2 is a side elevation of a first production line, having a single collection module with two separate fiberizing means, for producing the composite air filtration media of the present invention in accordance with the method of the present invention.

DESCRIPTION OF THE PREFERRED EMBODIMENTS

Figure 3:
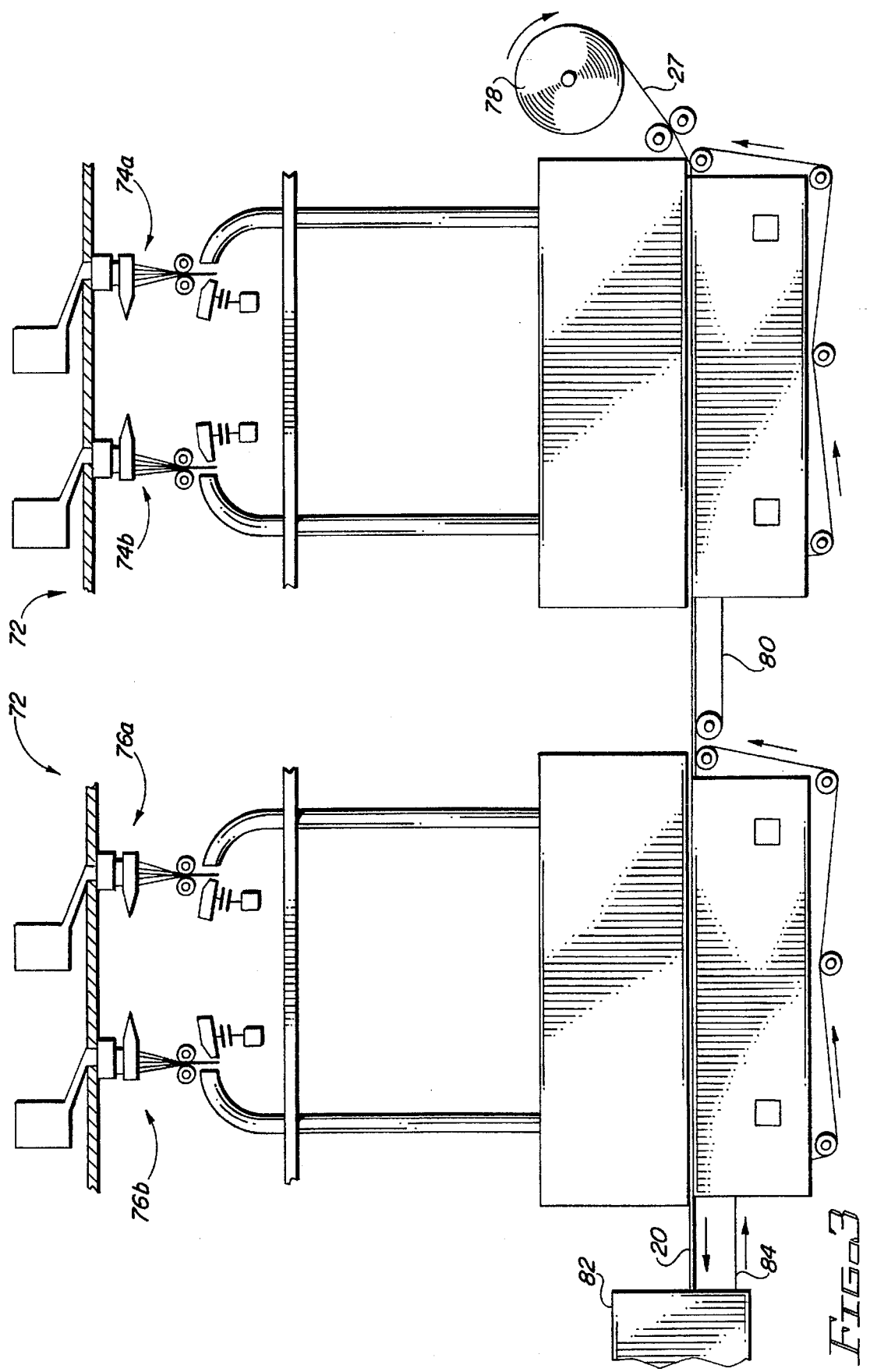
FIG. 3 is a side elevation of a second production line, having two collection modules with separate fiberizing means, for producing the composite air filtration media of the present invention in accordance with the method of the present invention.

FIG. 1 shows a composite air filtration media 20 of the present invention which comprises a backing layer 22, a fine glass fiber layer 24 and a coarse glass fiber layer 26. When used in an air filtration system, the coarse glass fiber layer 26 is the upstream layer of the composite; the fine glass fiber layer 24 is the intermediate layer of the composite; and the backing layer 22 is the downstream layer of the composite.

The backing layer 22 functions as a reinforcement for the composite air filtration media 20 adding strength to the composite air filtration media but adding little or nothing to the particle efficiency or the dirt loading capacity of the composite air filtration media. The backing layer 22 comprises a light weight (e.g. 0.4–0.5 oz. per square yard or 1.3 to 1.6 grams per/sq. ft.), non-woven, open mesh scrim of polyester, nylon or similar materials.

The intermediate fine glass fiber layer 24 comprises glass fibers having an average fiber diameter ranging from about $2.5 \times 10^{-5}$ inches to about $6.0 \times 10^{-5}$ inches and preferably from about $2.5 \times 10^{-5}$ inches to about $4.0 \times 10^{-5}$ inches. The average fiber diameter of the fine glass fibers in layer 24 and the density of layer 24 determine the particle efficiency of the composite air filtration media 20. The thickness of the backing layer 22 plus the fine glass fiber layer 24 ranges from about 0.10 inches to about 0.15 inches. The intermediate layer of fine glass fibers weighs between 1.1 grams per square foot and 2.7 grams per square foot. The weight of the backing layer 22 plus the fine glass fiber layer 24 is about 2.4 grams/sq. ft. to about 4.0 grams/sq. ft.

The upstream coarse glass fiber layer 26 comprises glass fibers having an average fiber diameter ranging from about $8.0 \times 10^{-5}$ inches to about $18.0 \times 10^{-5}$ inches and preferably, from about $8.0 \times 10^{-5}$ inches to about $12.0 \times 10^{-5}$ inches. The upstream, coarse glass fiber layer 26 collects predominately the larger dirt particles while the finer dirt particles are collected predominately by the fine glass fiber layer 24. Thus, the layers 24 and 26 each perform the function they perform the best and the overall performance of the filtration media is greatly enhanced over single layer filtration media. The average fiber diameter of the coarse glass fibers in layer 26 and the density of layer 26 determine the dirt loading capacity of the composite air filtration media 20. The thickness of the downstream, backing layer 22 plus the intermediate fine glass fiber layer 24 and the upstream coarse glass fiber layer 26 ranges from about 0.20 inches to about 0.32 inches. The upstream layer of coarse glass fibers weighs between 2.1 grams per square foot and 4.1 grams per square foot. The weight of the backing layer 22 plus the intermediate fine glass layer 24 plus the coarse glass fiber layer is about 4.5 grams/sq. ft. to about 6.5 grams/sq. ft.

The fine glass fibers of layer 24 and the coarse glass fibers of layer 26 are entangled at the interface 28 between the two layers. A bonding agent, such as a phenolic resin, applied to the fine and coarse glass fibers during the manufacture of the composite air filtration media 20 bonds the glass fibers within each layer together at their points of intersection; bonds the entangled fine and coarse glass fibers at the interface between the layers 24 and 26 together at their points of intersection; and bonds the fine glass fiber layer 24 to the downstream backing layer 22.

The apparatus disclosed in U.S. Pat. No. 3,981,708, issued to Romain Eugene Loeffler et al, on Sep. 21, 1976, and entitled, System For Producing Blankets and Webs of Mineral Fibers and the apparatus disclosed in U.S. Pat. No. 4,120,676, issued to William Peter Hahn et al, on Oct. 17, 1978, and entitled Method and Apparatus for Producing blankets of Mineral Fibers can be used in the method of the present invention to produce the composite air filtration media 20 of the present invention. The disclosures of these patents are hereby incorporated herein by reference in their entirety.

FIG. 2 shows a module 30 with two separate fiberizing means 32a and 32b. The fiberizing means 32a and 32b can be any conventional fiberizing means, such as, a rotary spinner fiberizer with or without additional attenuation means; a furnace forehearth fed flame attenuation fiberizer; or a pot and marble flame attenuation fiberizer. The fiberizing means shown in FIG. 2 are conventional pot and marble, flame attenuation fiberizers.

Each fiberizing means 32a and 32b comprises a plurality of melting pots 34a and 34b, respectively, from which molten glass filaments are extruded and drawn by pull rolls 36a and 36b. Glass marbles are delivered to the melting pots 34a and 34b from hoppers 38a and 38b by chutes 40a and 40b at a rate to maintain a desired head of marbles and molten glass within the melting pots. The marbles are melted in the melting pots 34a and 34b and the molten glass is extruded as primary, continuous filaments 42a and 42b through holes located in the bottoms of the melting pots.

The primary, continuous filaments 42a and 42b pass through the pull rolls 36a and 36b, over guide bars 44a and 44b, and into high temperature, high velocity gaseous flames or streams emitted by attenuation burners 46a and 46b. The primary continuous filaments 42a and 42b are resoftened, attenuated to a desired diameter, and formed into short fibers by the high temperature, high velocity gaseous flames. The attenuated fibers are carried by the high velocity, high temperature gaseous flames into the mouths 48a and 48b of ducts 50a and 50b which deliver the fibers to the collection chamber 52 of the module 30. As the fibers are discharged into the collection chamber 52 of the module 30 from the ducts 50a and 50b, a bonding agent, such as, a phenolic resin binder is sprayed onto the fibers by conventional binder applicators 54a and 54b.

The number of melting pots 34a and 34b, pull rolls 36a and 36b, and attenuation burners 46a and 46b provided and/or used in each fiberizing means 32a and 32b can vary depending on the thickness of the layer to be formed by the fiberizing means and the desired average fiber diameter to be produced for the particular layer. However, the melting pots, pull rolls and attenuation burners of each fiberizing means are aligned across the width of the module 30 to produce uniform streams of fibers that correspond to the width of the foraminous, collection conveyor 56. Typically, there are twelve to sixteen melting pots, pull rolls and attenuation burners arrayed across the width of the module 30 in each fiberizing means.

After the fibers are discharged from the ducts 50a and 50b and the bonding agent is applied to the fibers by the binder applicators 54a and 54b, the fibers are drawn down onto the backing layer 22 carried on the collection conveyor 56 or onto fibers already collected on the backing layer. The fibers are drawn down to the collection conveyor 56 by a suction box 58 which draws air through the collection conveyor and any layers on the collection conveyor 56. The suction box 58 is connected to exhaust fans (not shown) through ducts 59a and 59b. The reinforcing, backing layer 22 is drawn from a feed roll 60 and laid down on the collection conveyor 56 as it enters the collection chamber 52 by pull rolls 62.

The fiberizing means 32a is set up to produce fine glass fibers having an average fiber diameter ranging from about $2.5 \times 10^{-5}$ inches to about $6.0 \times 10^{-5}$ inches. The fiberizing means 32b is set up to produce coarse glass fibers having an average fiber diameter ranging from about $8.0 \times 10^{-5}$ inches to about $18.0 \times 10^{-5}$ inches. Accordingly, the layer 24 of fine glass fibers is collected directly on the reinforcing, backing layer 22 and the layer 26 of coarse glass fibers is collected on the layer 24 of fine glass fibers to form the three layer composite, glass fiber, air filtration media 20.

The composite air filtration media 20 is conveyed from the module 30 to a conventional curing oven 62 on a transfer conveyor 64. In the curing oven the bonding agent carried by the glass fibers is cured bonding the glass fibers within each layer 24 and 26 together at their points of intersection; bonding the entangled fine and coarse fibers at the interface between the layers 24 and 26 together at their points of intersection; and bonding the fine glass fiber layer 24 to the reinforcing, backing layer 22. The continuous, composite, air filtration media thus formed can be cut to length, packaged or otherwise processed for inventory or shipment.

The filtration characteristics of the continuous, composite air filtration media 20 produced by the method of the present invention can be varied for different products while the production line is in operation by changing the average fiber diameter of the fine glass fibers produced by the fiberizing means 32a and/or the average fiber diameter of the coarse glass fibers produced by the fiberizing means 32b. The filtration characteristics of the continuous, composite air filtration media 20 can also be varied by changing the weight per unit area of the fine glass fiber layer 24 and/or the coarse glass fiber layer 26 without interrupting the production process. This can be accomplished by changing the output of either or both of the fiberizing means 32a and 32b.

FIG. 3 shows a production line comprising two modules 70 and 2 for producing the composite air filtration media 20 of the present invention by the method of the present invention. The modules 70 and 72 are the same as module 30. Each module has fiberizing means 74a, 74b and 76a, 76b that are the same type of pot and marble flame attenuation fiberizing means used with and described in connection with module 30. Accordingly, the description of the fiberizing means 74a, 74b and 76a, 76b will not be repeated. The reinforcing, backing layer 22 is fed into the collection chamber of module 70 on a collection conveyor from a continuous, backing layer supply roll 78. A transfer conveyor 80 transfers the partially formed composite air filtration media from the collection chamber of module 70 to the collection chamber of module 72. From the module 72, the continuous, glass fiber, composite air filtration media is conveyed through a conventional oven 82 by a conveyor 84 where the bonding agent carried on the fine and coarse glass fibers is cured to bond the composite together as described above in connection with FIG. 2.

The filtration characteristics of the continuous, composite air filtration media 20 produced by the method of the present invention can be varied for different products while the production line is in operation by changing the average fiber diameter of the fine glass fibers produced by the fiberizing means 74a and 74b of module 70 and/or the average fiber diameter of the coarse glass fibers produced by the fiberizing means 76a and 76b of module 72. The filtration characteristics of the continuous, composite air filtration media 20 can also be varied by changing the weight per unit area of the fine glass fiber layer 24 and/or the coarse glass fiber layer 26 without interrupting the production process. This can be accomplished by changing the output of any one or more of the fiberizing means 74a, 74b, 76a and 76b or by shutting down one or more of the fiberizing means 74a, 74b, 76a and 76b.

In describing the invention, certain embodiments have been used to illustrate the invention and the practice thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A composite, glass fiber air filtration media comprising:
   a foraminous backing layer for reinforcing the composite air filtration media forming a downstream layer of said composite air filtration media;
   an intermediate layer of fine glass fibers for collecting fine particles from an air stream bonded to said foraminous backing layer; said fine glass fibers having an average fiber diameter ranging from about $2.5 \times 10^{-5}$ to about $6.0 \times 10^{-5}$ inches; said intermediate layer of fine glass fibers weighing between 1.1 and 2.7 grams per square foot; and the thickness of said foraminous backing layer and said intermediate layer of fine glass fibers ranging from about 0.10 to about 0.15 inches; and
   an upstream layer of coarse glass fibers for collecting coarse particles from an air stream; said upstream layer of coarse glass fibers being bonded to said intermediate layer of fine glass fibers; said coarse glass fibers having average fiber diameters ranging from about $8.0 \times 10^{-5}$ to about $18.0 \times 10^{-5}$ inches; said upstream layer of coarse glass fibers weighing between 2.1 and 4.1 grams per square foot; and the thickness of said foraminous backing layer, said intermediate layer of fine glass fibers and said upstream layer of said coarse glass fibers ranging from about 0.20 to about 0.32 inches.

2. A composite, glass fiber air filtration media comprising:
   a foraminous scrim backing layer for reinforcing the composite air filtration media, the foraminous scrim backing layer being a downstream layer of the composite air filtration media;
   an intermediate layer of fine glass fibers for collecting fine particles from an air stream, the intermediate layer of fine glass fibers being bonded to the foraminous scrim backing layer, the fine glass fibers having an average fiber diameter ranging from about $2.5 \times 10^{-5}$ to about $6.0 \times 10^{-5}$ inches, the intermediate layer of fine glass fibers having a weight between 1.1 grams per square foot and 2.7 grams per square foot; and
   an upstream layer of coarse glass fibers for collecting coarse particles from an air stream, the upstream layer of coarse glass fibers being bonded to the intermediate layer of fine glass fibers, the coarse glass fibers having an average fiber diameter ranging from about $8.0 \times 10^{-5}$ to about $18.0 \times 10^{-5}$ inches, and the upstream layer of coarse glass fibers having a weight between 2.1 grams per square foot and 4.1 grams per square foot.

3. The composite glass fiber air filtration media of claim 2, wherein: the thickness of the foraminous scrim backing layer and the intermediate layer of fine glass fibers ranges from about 0.10 to about 0.15 inches; the thickness of said foraminous scrim backing layer, the intermediate layer of fine glass fibers and the upstream layer of coarse glass fibers ranges from about 0.20 to about 0.32 inches; the fine glass fibers have an average fiber diameter ranging from about $2.5 \times 10^{-5}$ to about $4.0 \times 10^{-5}$, and the coarse glass fibers have an average fiber diameter ranging from about $8.0 \times 10^{-5}$ to about $12.0 \times 10^{-5}$.

* * * * *